Patented May 16, 1950

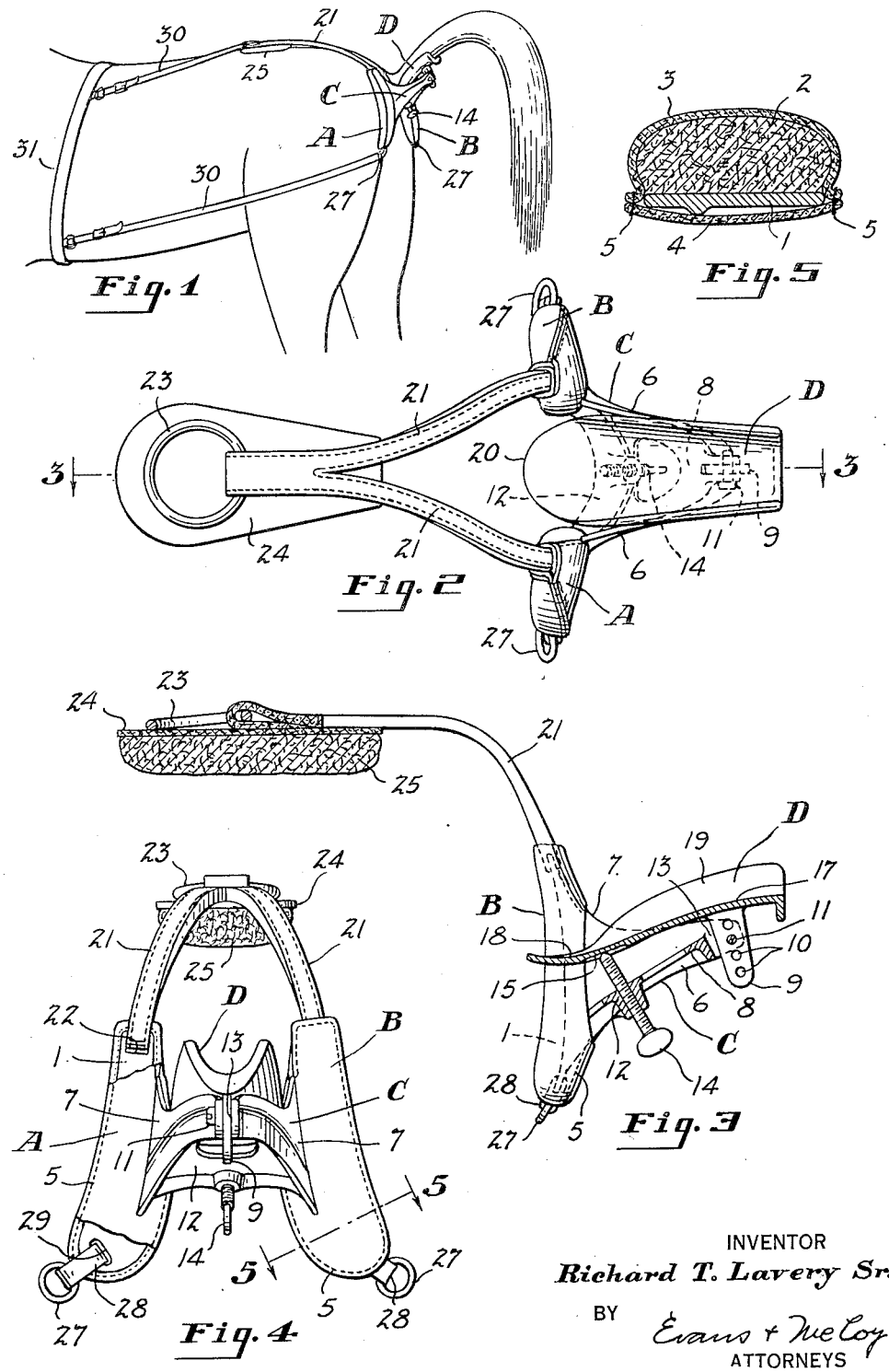

2,508,117

UNITED STATES PATENT OFFICE 2,508,117

TAIL SET

Richard T. Lavery, Sr., Gates Mills, Ohio, assignor of one-half to Everett G. Fahlman, Medina, Ohio Application October 28, 1947, Serial No. 782,616

8 Claims. (Cl. 54—78)

This invention relates to animal harness and more particularly to adjustable tail sets or cruppers and the like particularly for horses, although, of course, the device can be used on other animals.

Numerous devices have been proposed for supporting or straightening the tails of animals, or for imparting a desired arch or posture to their tails. Particular efforts have been made to provide tail sets or cruppers for supporting the tails of horses in desired arched or upright positions over periods of time sufficient to enable the tails to overcome any natural tendency to crookedness or to "take on" or become "set" in an attractive curvature or arch. It has been found that the hindquarters or cruppers of different horses vary considerably. In other words, horse rumps differ and a mechanical crupper designed to fit one horse will not necessarily fit another. Unless such a device conforms to the particular shape of the animal being fitted the animal is apt to become nervous and fitful while wearing the device; possibly because of irritations and discomforts experienced. Furthermore, it frequently appears that animals object to any interference with the natural shape or condition of their tails and seek to thwart man's efforts to improve upon nature. An animal is likely to make repeated attempts to free himself or get out of the crupper or tail set and an ill-fitting device may be readily dislodged.

It is therefore one of the principal objects of the present invention to provide an improved tail set or crupper which is adjustable so that it can be accurately and securely fitted and attached to animals having hindquarters of different shapes and sizes.

Another object is to provide a crupper or tail set which minimizes discomfort to the animal wearing such a device. A particular aspect of this phase of the invention is directed to the provision of an improved spoon or tail receiving member designed and shaped in reference to the anatomy of a horse's tail so as to support such tail in a natural arch with minimum confinement while preventing the animal from dislodging or disengaging his tail from the device.

Another object is to provide an improved mechanical tail set having a tail receiving spoon member supported on a frame, in which the spoon member is adjustable on the frame for both tilting movement and bodily vertical movement.

A further object of the invention is to provide a tail set having a frame which includes spaced pads connected by a bridge structure that extends laterally from the pads as a cantilever, the cantilever bridge serving as a mount to receive the tail supporting spoon member. The preferred aspect of this phase of the invention contemplates the pivotal attachment of the outer end of the spoon member to the outer end of the cantilever bridge and the adjustable supporting of the inner end of the spoon member on the inner end of the cantilever bridge.

Other objects and advantages relate to certain details of construction and arrangements of parts which will become apparent from the following description of a preferred embodiment of the invention made in connection with the accompanying drawings forming a part of this specification. Like parts throughout the several views of the drawings are indicated by the same numerals and letters of reference.

In the drawings:

Figure 1 is a view showing the mechanical crupper or tail set device of the present invention attached to a horse and positioned to support tail of the animal;

Figure 2 is a top plan view of the tail set or crupper with the attaching harness removed, the device being slightly enlarged with respect to Figure 1;

Figure 3 is a vertical sectional view taken substantially on the line indicated at 3—3 of Figure 2;

Figure 4 is an elevational view of the device, partly in section and with parts broken away; and Figure 5 is a sectional detail through the end portion of one of the pads of the frame, this view being taken substantially on the line indicated at 5—5 of Figure 4 and enlarged with respect to that figure.

The mechanical tail set or crupper comprises a frame structure which is attachable to the hindquarters or crupper of the animal and a tail supporting member or spoon disposed under the tail of the animal and mounted on the frame. The frame, although it may be fabricated from separate parts, is preferably made in the form of an integral casting of aluminum or other light metal. A pair of elongated pads A and B, disposed in spaced relation, are connected by a bridge structure C. Each of the pads includes an internal metal plate portion 1, which has rounded ends and is tapered along its length, the wide end being at the lower end or bottom of the pad. The pad plates 1 are also curved along their length so as to fit the curvature of the animal's rump. Against the curved underside of each of the plates 1 is disposed a quantity of soft padding material 2 which is held in place by a soft leather cover 3 stitched at 5 along its edges to a companion leather cover 4 which overlies the outer or convex face of the pad plate 1.

The bridge structure C, formed of cast aluminum or other metal and preferably integral with the metal plates 1 of the spaced pads A and B, is connected to central portions of the adjacent edges of the plates 1. Side portions 6 of the bridge are approximately normal to the plane of the pad plates 1 and have relatively broad base portions 7 providing relatively long lines of connection to the pad plates.

The bridge structure C, which extends across between and connects the pads A and B, also extends laterally out from the plane of the pads in cantilever fashion and is so positioned as to underlie the tail of the animal to which the device is attached. At the outer end of the cantilever bridge the side portions 6 are joined together at 8, a vertical slot 13 being provided to receive and guide a depending integral foot portion or element 9 formed on the underside of an elongated trough shaped spoon or tail supporting member D. The spoon foot 9 is formed with a number of holes or apertures 10 vertically spaced along its length and alternatively receivable on a screw 11 that extends across the slot 13 in the outer end of the bridge C, the screw being threaded into the bifurcated end portion of the bridge.

Adjacent the pads A and B an integral cross member 12 extends between and connects the base portions 7 of the bridge sides 6. This cross member strengthens the bridge structure and at its center threadedly receives an upright thumb screw 14 which engages the underside of the inner end of the spoon or support member D. The thumb screw can be turned for adjustment in the cross member to raise and lower the spoon and to vary the angularity of the spoon with respect to the frame structure. The top end of the thumb screw is received in an elongated groove 15 formed centrally on the underside of the spoon D, the interengagement between the groove and the end of the thumb screw resisting lateral displacement of the spoon.

The trough shaped spoon or tail receiving member D may be conventional but preferably has a bottom shaped into the form of an ogee curve longitudinally, with convex portion 17 adjacent the outer end of the spoon substantially over the supporting foot 9, and with concave portion 18 at the inner end of the spoon substantially over the supporting and adjusting screw 14. The concave spoon portion 18 underlies the base portion of the animal's tail and is moved into firm engagement with the underside of the tail by adjustment of the screw 14, the tail being thereby held up in a natural arch.

As shown in plan form in Figure 2 the spoon is of longitudinally tapered form, the outer end, which includes the convex bottom 17, being narrower than the inner end which includes the concave bottom 18. Side walls 19 of the spoon are highest at the outer end of the spoon and at the inner end adjacent or alongside the concave bottom 18 the side walls are relieved or cut away so that the base of the animal's tail is substantially unconfined laterally. The upper edges of the side walls 19 curve downwardly toward the base of the spoon and merge into the side edges of the concave bottom 18 which extend around the base of the spoon in a continuous curve 20.

Attachment means or harness for holding the mechanical crupper on the rear end of a horse or other animal, includes straps 21 which are looped through openings 22 in the upper rounded ends of the pad plates 1 and are carried forwardly to a common ring 23. The apertured ends of the pad plates 1 are enclosed in the leather covers 3 and 4 and the ring 23 is provided with a leather shield or guard 24 sewn to the underside of the straps 21. The shield has a wool padding 25 on its underside for contact with the back of the animal. Metal rings 27 are attached to the lower ends of the pad plates 1 by strap loops 28 which pass through apertures or openings 29 formed in the lower rounded ends of the plates. These openings and the inner ends of the straps 28 are also enclosed by the leather sheet covers 3 and 4. The metal rings 27 on the lower ends of the tail set and also the top metal ring 23 are connected by harness straps 30 to a girth or surcingle 31 which embraces the body of the animal.

In adjusting the tail set of the present invention to the crupper of an animal the pads A and B are positioned flatwise against the animal's rump with the bridge C and the spoon D underlying the animal's tail. By longitudinal movement of the adjusting thumb screw 14, which is spaced longitudinally of the spoon from the pivot screw 11, the angularity of the spoon with respect to the frame of the device is adjusted to hold the animal's tail in the desired elevation or arch. Should it appear that the size, curvature, or shape of the hind quarters or rump of the animal warrants an upward or downward shifting of the frame of the tail set, the screw 11 is shifted into another of the holes 10 of the spoon supporting foot 9 so that the spoon D and the bridge structure C can be shifted bodily with respect to one another. This bodily shifting of the spoon on the pivot means with respect to the supporting frame of the crupper device is also used to vary the angle of the spoon with respect to the frame in adjusting the arch or curvature of the tail of the animal to the desired position.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. A tail set for a horse comprising a frame having a laterally extending cantilever portion with an outer free end, the frame being attachable to the crupper of an animal with said lateral portion disposed under the tail of the animal, a supporting member for receiving the animal's tail, said supporting member being positioned so as to be disposed between the tail and the lateral frame portion, means attaching a portion of the supporting member intermediate its ends to the outer free end of the lateral frame portion for tilting movement, and screw means threaded through the frame to bear against the supporting member to vary the angularity of the latter with respect to the frame.

2. In a mechanical crupper for a horse, a frame structure having means of attachment for holding the same on the animal, a member for receiving and supporting the tail of the animal, and means mounting the support member on the frame structure for bodily shifting movement and also for tilting movement in adjusting the crupper to different animals, said mounting means including an adjustable height pivot and an element spaced from the pivot to control the tilt of the support member.

3. In a mechanical crupper for a horse, a frame structure having means of attachment for holding the same on the animal, a member for receiving and supporting the tail of the animal, said member having a depending foot portion so positioned as to be angularly disposed relative to a supported tail, means pivoting the depending foot portion of the support member on the frame structure, said pivot means being adjustable bodily to vary the height of the support member with respect to the frame structure, and means spaced from the pivot means to control the tilt of the support member relative to the frame structure.

4. In a mechanical crupper for a horse, a frame structure having means of attachment for holding the same on the animal, a member for receiving and supporting the tail of the animal, said member having a depending foot portion so positioned as to be angularly disposed relative to a supported tail, means pivoting the depending foot portion of the support member on the frame structure, said pivot means being adjustable bodily to vary the height of the support member with respect to the frame structure, and screw means threaded through the frame structure to bear against the support member along an axis spaced from the depending portion of the support member.

5. A tail set device for an animal comprising a frame and means for attaching the frame to an animal wearing the device, said frame including a pair of spaced pad parts receivable against the crupper of an animal and a bridge structure connecting the pad parts and extending laterally from the pad parts as a cantilever, the bridge structure being substantially rigid with the pad parts and positioned so as to extend under the tail of an animal wearing the device, an elongated tail receiving spoon having an inner end disposed substantially between the pad parts and an outer end remote from the pad parts, and means mounting the spoon on the bridge structure for tilting movement about an axis remote from the inner end of the spoon.

6. A tail set device for an animal comprising a frame and means for attaching the frame to an animal wearing the device, said frame including a pair of spaced pad parts receivable against the crupper of an animal and a bridge structure connecting the pad parts and extending laterally from the pad parts as a cantilever, the bridge structure being substantially rigid with the pad parts, an elongated tail receiving spoon mounted on the bridge structure and having an inner end disposed substantially between the pad parts, the mounting means for the spoon including a pivot on the bridge structure remote from the inner end of the spoon, and screw means carried by the bridge structure and engageable with the spoon intermediate the pivot and the inner end of the spoon for raising and lowering the latter and adjusting the device to the animal wearing the same.

7. A tail set device for an animal comprising a frame and means for attaching the frame to an animal wearing the device, said frame including a pair of spaced pad parts receivable against the crupper of an animal and a bridge structure connecting the pad parts and extending laterally from the pad parts as a cantilever, the bridge structure being substantially rigid with the pad parts, an elongated tail receiving spoon having an inner end disposed substantially between the pad and parts and an outer end remote from the pad parts, adjustable height pivot means mounting the spoon on the bridge structure for tilting movement about an axis remote from the inner end of the spoon, and adjustable height means carried by the bridge structure and engageable with the spoon intermediate the pivot means and the inner end of the spoon for supporting the spoon in different relative positions with respect to the frame in adjusting the device to an animal wearing the same.

8. A tail set device for an animal comprising a frame and means for attaching the frame to an animal wearing the device, said frame including a pair of spaced pad parts receivable against the crupper of an animal and a bridge structure connecting the pad parts and extending laterally from the pad parts as a cantilever, the bridge structure being substantially rigid with the pad parts, an elongated tail receiving spoon having an inner end disposed substantially between the pad parts and an outer end remote from the pad parts, and spaced supporting elements carried by the bridge structure and longitudinally spaced portions of the spoon for mounting the latter on the bridge structure, one of the supporting elements being a pivot, the other supporting element being an adjustable height support and both supporting elements being spaced inwardly from the ends of the spoon.

RICHARD T. LAVERY, Sr.

REFERENCES CITED

The following references are of record in the file of this patent:

UNITED STATES PATENTS

| Number | Name | Date |
| --- | --- | --- |
| 509,816 | Lavine | Nov. 28, 1893 |
| 1,047,808 | Hinkle and Catlett | Dec. 17, 1912 |
| 1,810,832 | Judy | June 16, 1931 |
| 1,991,299 | Swaggerty | Feb. 12, 1935 |
| 2,150,526 | Swaggerty | Mar. 14, 1939 |